2,986,840
SEED AND METHOD OF PREPARING SAME WITH UREA-ALDEHYDE RESIN

Hugh R. Rogers, 620 Delaware Ave., McComb, Miss.
No Drawing. Filed Dec. 16, 1957, Ser. No. 702,756
5 Claims. (Cl. 47—1)

This invention relates to the preparation of improved seed by the addition thereto of materials which may also be beneficial to the soil and to the plant and fruit produced. The invention also relates to the means by which said added materials are caused to adhere to the seed in sufficient quantities to be of said benefit, such means including urea-aldehyde resin.

Heretofore, the treatment of seed has been confined to spraying or other such treatment for the purpose of preventing destruction by insects or rot. In such fumigating treatments no pickup in weight by the seed is apparent or intended. The materials used have had no beneficial effect on the soil or plant produced therefrom.

It is an object of this invention to provide improved seed and method for their preparation in which various materials are caused to adhere to the seed in sufficient quantities to be of benefit also to the soil in which the seed are planted.

It is another object of this invention to provide improved seed by the addition thereto of materials which are also beneficial to growth of the plant derived from the seed.

Still another object of the invention is to provide treated seed having materials present which are also beneficial to the productivity of the plant derived from the seed. Other objects will be apparent from the following detailed description thereof.

According to this invention, the seed are mixed with materials and said materials caused to adhere thereto to the extent that a substantial increase in weight is noted. These added materials are of a class of compounds such as the major and minor plant foods, soil sterilizers or other materials beneficial to the seed, soil, plant or fruit produced. In the practice of the invention the increase in weight of the treated seed is at least 1% due to adhering of the added materials. There is no defined maximum amount of materials which can be caused to adhere to the seed as this is dependent upon the type of seed treated, the type materials added and means of applying same.

In the treatment of corn or delinted cotton seed which present a smooth surface it is necessary that a resinous compound be utilized to adhere the materials to the seed. Examples of such preferred resinous materials, but not limited thereto, are the urea formaldehyde resins, melamine formaldehyde resins, polyvinyl acetate resins and other polymers which exhibit adhesive properties and will form a dry and stable film either at room or elevated temperatures.

In the treatment of seed such as cotton seed having the cellulose fiber linters present such fibers act as a natural carrier for the added materials and the use of the resinous material is not necessary. However, when such resinous compounds are used the fibers are caused to adhere more closely to the seed and present a very slick surface. The resinous material also prevents loss of the added materials during handling and such seed can be classified as to size by screening and can be drop planted in the same manner as delinted seed. By the type and amount of resinous materials added it is possible to prevent the germination of the inferior seed and thus they can remain, after planting, as a plant food supplement. In the treatment of the seed having these natural carriers present for the added materials it is possible to adhere large quantities of the plant foods or other materials to the seed and thus give the plant produced therefrom an added boost in growth. Such treatment of the seed makes unnecessary the separate application of plant food at time of planting and additional plant food can be applied later, if necessary, to the plant. Use of resinous materials also makes the seed more resistant to rot or decay when unfavorable weather conditions prevail after planting. Through the proper selection of the class of materials to be added to the seed the benefits derived therefrom can be directed to improvement in the root structure, the stem or the fruit produced by the plant or to the soil or other media in which seed are planted.

In the treatment of the seed with the commercially known fertilizers or plant foods said materials can be utilized as the solids or as solutions. It is preferred, however, that the compounds used be of high purity so that the adhered materials will show the highest concentration of plant food elements. When the seed are admixed with one or more of the materials to be adhered thereto said materials can be prepared compounds or the added materials can be formed in the presence of the seed by the chemical reaction between two or more materials. Any order of addition of the materials may be used and there may or may not be a chemical reaction between the added materials and materials inherent to the seed. Once the desired materials have been added and excess water formed or used its removal therefrom can be accomplished in any manner not detrimental to the seed.

The following examples are given to show practice of the invention. The density of the treated cotton seed is given as compared to the untreated seed having a designated density of 1. The percentage of the plant food elements given are calculated from the amount of material added or adhered thereto. Samples from all examples given below were germinated and the plants produced from Example #7 were cultivated and the fruit harvested.

Example 1

16 parts of cotton seed having the linters present was mixed with 12 parts of a 65% urea formaldehyde resin to which had been added 1.5 parts of urea and ½ part of ammonium chloride as the hardening agent. The treated seed were allowed to air dry and were very slick in appearance and feel. They showed a 50% uptake of solids, a density of 2 and contained 18% of added nitrogen.

Example 2

8 parts of cotton seed having the linters present was first mixed with 2 parts of a 33% solution of sulfuric acid and then with 1.5 parts of a 50% potassium hydroxide solution. The treated seed were allowed to air dry with aid of heat of neutralization created. The seed were slightly fluffy, showed an uptake of solids of 14.7%, a density of 1.25 and contained 7% added potassium and 2.8% added sulfur.

Example 3

4.6 parts of the treated seed from Example #2 was mixed with 1 part of a 65% urea formaldehyde resin to which had been added 2 parts of water containing 1 part of urea and .25 part of ammonium chloride and the treated seed allowed to air dry. The seed showed an overall uptake of solids of 62.5%, a density of 2 and were very slick in appearance and feel. The calculated added percentage of plant foods was potassium 7%, nitrogen 16% and sulfur 2.8%.

Example 4

To 8 parts of cotton seed having the cellulose fiber linters present was added 3 parts of urea dissolved in 3 parts of water and mixed well. 2 parts of a 50% water emulsion of a polyvinyl acetate resin was added and mixed well and seed dried under warm air. These seed presented a somewhat slick appearance and feel but were hygroscopic. They showed a 50% uptake in weight and contained 17% of added nitrogen.

*Example 5*

8 parts of cotton seed having the linters present was first mixed with 2 parts of a 50% solution of potassium hydroxide, then with 2 parts of a 29% ammonia solution, then with 4 parts of a 33% solution of sulfuric acid and finally with 2 parts of a 65% urea formaldehyde resin and seed allowed to air dry. The dried seed showed an increase in weight of 55%, a density of 2 and contained 8.7% potassium, 5.3% sulfur and 10.5% nitrogen as added materials. The treated seed were slick and free flowing due to lint being held closely to seed.

*Example 6*

8 parts of cotton seed having the linters present was first mixed thoroughly with 3 parts of a water solution containing 1 part of urea and 1 part of ammonium chloride and then with 2 parts of a 37% formaldehyde solution and allowed to air dry. The added materials reacted together to form a resin film which held the lint tightly to the seed and the seed showed an increase in weight of 25% and contained 9% of added nitrogen.

*Example 7*

15 parts of cotton seed having the fiber linters present was first mixed with 6 parts of a 50% solution of potassium hydroxide and then with 3 parts of an 85% solution of phosphoric acid and the seed dried with the aid of the heat of neutralization produced. 3 parts of ammonium nitrate dissolved in 3 parts of water was then admixed thereto and the seed again dried to remove excess water. Finally, 2 parts of a 60% urea formaldehyde resin was added and admixed thereto and the seed dried under heat. The treated seed showed a 47% uptake of solids, a density of 2, were very free flowing and contained as added plant foods 13.7% potassium, 5.5% phosphorus and 9% nitrogen.

*Example 8*

8 parts of corn seed was mixed with an excess of urea formaldehyde resin containing ammonium chloride as catalyst, the excess resin drained off and seed allowed to air dry. The treated seed showed an increase in weight of 25% and contained a calculated 7.0% of added nitrogen.

The foregoing examples show the practice of the invention with respect to the use of the major plant foods and soil sterilizers such as formaldehyde. However, in the practice of the invention is obvious other materials such as the minor elements or radio active materials or others beneficial may be employed and the scope of the invention is limited only by the appended claims.

I claim:

1. A method of improving cotton seed having the fiber linters present which comprises mixing the seed with a urea-aldehyde resinous material having at least one of the plant food elements of the group consisting of N, P, K, and S, and said added material being present in the amount of at least 1% on the weight of the seed.

2. Improved seed comprising seed coated with at least 1% by weight of materials consisting of a urea-aldehyde resin containing at least one of the elements of the group consisting of N, P, and K, and said elements being bonded to said seed by said resinous material.

3. A method of preparing improved cotton seed which comprises mixing the seed with a water solution of urea and an ammonium salt, adding to the treated seed aqueous formaldehyde, and thereafter drying the treated seed whereby there is produced upon the treated seed a coating of urea-formaldehyde resin formed in situ.

4. A method of bonding nutrient material to cotton seed which comprises mixing the seed with a solution of urea-formaldehyde resin containing dissolved salts which include at least one of the elements of the group consisting of K, P, and S, and thereafter drying the treated seed.

5. A method of preparing improved cotton seed which comprises treating the seed separately with solutions of urea and formaldehyde, drying the treated seed to produce a coating thereon of urea-formaldehyde resin formed in situ, at least one of said urea and formaldehyde solutions containing dissolved salts which include at least one of the elements of the group consisting of K, P, and S.

References Cited in the file of this patent

UNITED STATES PATENTS

| | | |
|---|---|---|
| 181,136 | Brandriff | Aug. 15, 1876 |
| 2,083,065 | Heyl | June 8, 1937 |
| 2,502,809 | Vogelsang | Apr. 4, 1950 |
| 2,651,883 | Hedrick | Sept. 15, 1953 |
| 2,766,283 | Darden | Oct. 9, 1956 |
| 2,785,969 | Clawson | Mar. 19, 1957 |